US009760227B2

United States Patent
Chen et al.

(10) Patent No.: US 9,760,227 B2
(45) Date of Patent: Sep. 12, 2017

(54) OGS CAPTIVE TOUCH PANEL AND METHOD FOR MANUFACTURING SAME

(71) Applicant: FUJIAN KECHUANG PHOTOELECTRIC CO., LTD., Putian, Fujian Province (CN)

(72) Inventors: Zuhui Chen, Putian (CN); Huaiqing Cai, Putian (CN); Yuhui Lin, Putian (CN)

(73) Assignee: Fujian Kechuang Photoelectric Co., Ltd., Putian, Fujian Province (CN)

( * ) Notice: Subject to any disclaimer, the term of this patent is extended or adjusted under 35 U.S.C. 154(b) by 160 days.

(21) Appl. No.: 14/764,465

(22) PCT Filed: Jan. 28, 2014

(86) PCT No.: PCT/CN2014/071654
§ 371 (c)(1),
(2) Date: Oct. 13, 2015

(87) PCT Pub. No.: WO2014/117728
PCT Pub. Date: Aug. 7, 2014

(65) Prior Publication Data
US 2016/0124546 A1    May 5, 2016

(30) Foreign Application Priority Data

Jan. 30, 2013 (CN) .......................... 2013 1 0036353
Jan. 30, 2013 (CN) .......................... 2013 1 0042888
Jan. 30, 2013 (CN) .......................... 2013 1 0042903

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04103* (2013.01); *G06F 2203/04107* (2013.01); *G06F 2203/04112* (2013.01)

(58) Field of Classification Search
CPC ........ G06F 3/044; G06F 3/0416; G06F 3/041; G06F 1/1626; G02F 1/13338; H01H 5/04; H05K 3/30
(Continued)

(56) References Cited

U.S. PATENT DOCUMENTS

2010/0128001 A1    5/2010    Kimura et al.
2011/0227846 A1    9/2011    Imazeki
(Continued)

FOREIGN PATENT DOCUMENTS

CN    1447279    10/2003
CN    101526874    9/2009
(Continued)

OTHER PUBLICATIONS

The International Search Report and Written Opinion, mailed on May 8, 2014, in the corresponding PCT Appl. No. PCT/CN2014/071654.

*Primary Examiner* — Fred Tzeng

(57) ABSTRACT

The present invention provides an OGS capacitive touch panel, including a substrate, a touch control unit, an insulating layer, a conductor and a trace of the touch control unit, wherein the touch control unit and the insulating layer are arranged on a first surface of the substrate and the former is in the active area and the latter on the periphery of the capacitive touch panel; the trace of the touch control unit extends from the touch control unit on the first surface; on the periphery of the capacitive touch panel, the insulating layer partly covers the trace of the touch control unit, and the conductor is electrically connected to the trace of the touch
(Continued)

control unit on the part of the trace of the touch control unit which is uncovered by the insulating layer. The method for manufacturing the OGS capacitive touch panel of the invention arranges the process of forming the insulating layer after the process of forming the touch control units and the traces of the touch control units. In the invention, the problem of color changing and insulativity deteriorating of the insulating layer, which is formed by general colored ink, gloss varnish or colored photo-sensitive resist, aroused by the poor high-temperature resistance is solved, and the difficulty in coating process and traces having to get over a step are avoided. The OGS capacitive touch panel of the invention is simple structured and reliable; its manufacturing method has less processes and is easy to carry on.

1 Claim, 12 Drawing Sheets

(58) Field of Classification Search
USPC .......................................................... 345/174
See application file for complete search history.

(56) References Cited

U.S. PATENT DOCUMENTS

| | | | | |
|---|---|---|---|---|
| 2011/0234526 | A1* | 9/2011 | Mi | H05K 3/30 345/174 |
| 2011/0298739 | A1* | 12/2011 | Wu | G06F 3/041 345/173 |
| 2013/0082961 | A1* | 4/2013 | Wang | G06F 3/044 345/173 |
| 2013/0154991 | A1 | 6/2013 | Yilmaz | |
| 2013/0215082 | A1* | 8/2013 | Mi | G06F 3/044 345/174 |
| 2014/0049703 | A1* | 2/2014 | Hu | G02F 1/13338 349/12 |
| 2014/0132861 | A1* | 5/2014 | Wang | G06F 3/044 349/12 |
| 2014/0160373 | A1* | 6/2014 | Hsu | G06F 3/044 349/12 |
| 2014/0184950 | A1* | 7/2014 | Chu | G06F 3/0416 349/12 |
| 2014/0184952 | A1* | 7/2014 | Chu | G06F 3/044 349/12 |
| 2014/0240620 | A1* | 8/2014 | Chiu | G06F 1/1626 349/12 |
| 2015/0122620 | A1* | 5/2015 | Koepsell | H01H 5/04 200/468 |
| 2015/0317031 | A1* | 11/2015 | Mi | H05K 3/30 345/174 |
| 2016/0041643 | A1* | 2/2016 | Gu | G06F 3/044 345/174 |
| 2016/0195974 | A1* | 7/2016 | Liu | G06F 3/044 345/173 |

FOREIGN PATENT DOCUMENTS

| | | |
|---|---|---|
| CN | 101566742 | 10/2009 |
| CN | 201369038 | 12/2009 |
| CN | 201594244 | 9/2010 |
| CN | 101853115 | 10/2010 |
| CN | 201600670 | 10/2010 |
| CN | 102207805 | 10/2011 |
| CN | 102236480 | 11/2011 |
| CN | 102331894 | 1/2012 |
| CN | 202217249 | 5/2012 |
| CN | 202422064 | 9/2012 |
| CN | 202472616 | 10/2012 |
| CN | 102819372 | 12/2012 |
| CN | 202584085 | 12/2012 |
| CN | 202615358 | 12/2012 |
| CN | 103246413 | 8/2013 |
| CN | 103257767 | 8/2013 |
| CN | 103257768 | 8/2013 |

* cited by examiner

OGS CAPTIVE TOUCH PANEL AND METHOD FOR MANUFACTURING SAME

CROSS-REFERENCE TO RELATED APPLICATIONS

This application is a National Stage Application of PCT/CN2014/071654 filed Jan. 28, 2014, which claims priority from Chinese Patent Application No. 201310042903.1 filed on Jan. 30, 2013, Chinese Patent Application No. 201310042888.0 filed on Jan. 30, 2013 and Chinese Patent Application No. 201310036353.2 filed on Jan. 30, 2013. The priority of each prior mentioned application is claimed. Each of the prior mentioned applications is hereby incorporated by reference herein in its entirety.

FIELD OF THE INVENTION

The present invention relates to a capacitive touch panel, and more particularly, to an OGS capacitive touch panel and method for manufacturing same.

DESCRIPTION OF THE PRIOR ART

With the development of the new technology of touch user interface, touch panels are widely used in various digital information systems. The touch panel can be seen on small devices such as mobile phone and digital products, on medium devices such as car navigation system, tablet computer, play station and household appliances, and on large devices such as public inquiry system, portable computer and medical apparatus. The touch panel products have a remarkable market prospect. Based on their working principles, the touch panels can be divided into resistive touch panels (a.k.a. resistive touchscreens) and capacitive touch panels (a.k.a. capacitive touchscreens), wherein the capacitive touch panels have dominated the touch panels market, esp. the touch panels market for mobile phones and tablet computers because of their advantages of high accuracy, long lifetime and supporting multi-touch input.

Nowadays, there are two types of capacitive touch panels: surface capacitive and projected capacitive, and the latter dominates. The capacitive touch panels in this description are projected capacitive touch panels if no other declaration is made.

The manufacturing process of a capacitive touch panel includes adding a layer or two layers of transparent conductive film such as ITO (Indium Tin Oxide) film on a glass sheet, forming an array of touch control units with the conductive film, forming conductors on one or more peripheral side(s) of the touch panel to connect the touch control units and the control circuit of the capacitive touch panel to load electrical signals onto the touch control units and extract electrical signals thereof. When a finger is touching the panel, a coupling capacitor forms between the finger and a touch control unit due to the electric field in the human body. The touching position can be precisely determined by measuring the currents away from the conductors and calculating the proportions of the currents therebetween.

In these years, OGS (One Glass Solution) capacitive touch panel has been developed in the technical field of capacitive touch panel. An OGS capacitive touch panel adopts only one glass sheet which serves as cover glass and on which the array of ITO touch control units is formed. Compared with the traditional capacitive cover panel with two glass sheets, OGS capacitive touch panel saves one glass sheet, has simpler structure, is lighter, thinner and more transparent, and thus has a lower cost and higher yield.

FIGS. 1 and 2 schematically show the structure of an OGS capacitive touch panel, wherein the active area (AA) is the middle region on the surface of the substrate 1, an array of touch control units formed with ITO film, such as the touch control unit 2 consisting of a driving part and a sensing part, is arranged in the active area; the black matrix (BM) around the visual area (VA) is an insulated light shielding layer 3; multiple conductors are arranged on the light shielding layer 3 including the conductors connecting the driving parts of the touch control units and the conductors connecting the sensing parts of the touch control units, such as the conductor 40 and the conductor 41 where the former load the electrical signals (driving signals) onto the driving parts of a row of touch control units and the latter extract the electrical signals (sensing signals) from the sensing parts of a column of touch control units; or conversely, the former extract the electrical signals (sensing signals) from the sensing parts of a column of touch control units and the latter load the electrical signals (driving signals) onto the driving parts of a row of touch control units; the conductors are used to connect the control circuit of the capacitive touch panel and the traces of the touch control units, the connecting between the conductors and the control circuit is by way of soldering, bonding, hot pressure welding, and etc., wherein the hot pressure welding is heating and pressing the conductors and the electrodes of the control circuit together to make them electrically connected (and in this description, the parts of the conductors to connect the control circuit are called extracting parts of the conductors); the traces of each touch control unit extend from the driving part and the sensing part of the touch control unit and have their ends electrically connected to the respective conductors. For instance, the trace 20 of the touch control unit extends from the driving part of the touch control unit 2 and has its end electrically connected to the conductor 40; the trace 21 of the touch control unit extends from the sensing part of the touch control unit 2 and has its end electrically connected to the conductor 41. The traces of each touch control unit and the touch control units are formed in one step, for example, they are formed in one photolithographic cycle.

As can be seen from the sectional drawing of FIG. 2, each trace, such as the trace 21 of the touch control unit, has to get over the step between the substrate 1 and the light shielding layer 3 whose height is the thickness of the light shielding layer 3. The thickness of the light shielding layer 3 produced by nowadays process is of microns, that is to say that the thickness of the light shielding layer 3 is about 1.0-50.0 μm; and nowadays the traces are produced by etching the ITO film which is to form the touch control units and whose thickness is of 15-30 nm, so the ITO film of 15-30 nm thickness has to get over the step of 1.0-50.0 μm height and is prone to break there when it is deposited on the substrate 1. This will result in one or more broken trace(s) produced by etching the ITO film. Besides, the light shielding layer 3 being deposited on the substrate 1 prior to the ITO film requires low temperature processes afterwards to avoid any change to its performance and color, such as insulativity deterioration and yellowed color. In the prior art the technical solution to this problem is to deposit a layer of overcoat (OC) or other transparent film flush with the step before depositing the ITO film and adopt depositing process(es) of low temperature coating to produce ITO film (and OC film or other transparent film) after the process of the light shielding layer 3. But this solution requires additional processes, high-temperature resistant material for the light shielding layer, and even low temperature coating process. To deliver the substrate to a coating process line which may be in another foundry will make the processes of the OGS capacitive touch panel more difficult and complicated.

Therefore, the skilled person in the art has been trying to develop an OGS capacitive touch panel and method for manufacturing the OGS capacitive touch panel, which avoids a light shielding layer of high-temperature resistant material and the coating process, and wherein the traces need not to get over the step between the substrate and the light shielding layer.

SUMMARY OF THE INVENTION

Given the drawbacks in the prior art, the invention aims to provide an OGS capacitive touch panel and method for manufacturing same, by arranging the process of producing the light shielding layer after the process of producing the touch control units and the traces of the touch control units which avoids the light shielding layer of high-temperature resistant material and the coating process, and makes it unnecessary for the traces to get over the step between the substrate and the light shielding layer.

To realize the above purpose, the invention provides a capacitive touch panel, including a substrate, a touch control unit, an insulating layer, a conductor and a trace of the touch control unit, wherein the touch control unit and the insulating layer are arranged on a first surface of the substrate, the touch control unit is arranged in active area of the capacitive touch panel, and the insulating layer is formed on the periphery of the capacitive touch panel, characterized in that the trace of the touch control unit extends from the touch control unit on the first surface; on the periphery of the capacitive touch panel, the insulating layer partly covers the trace of the touch control unit, and the conductor is electrically connected to the trace of the touch control unit on the part of the trace of the touch control unit which is uncovered by the insulating layer.

Further, the insulating layer is a light shielding layer formed by one or more of colored ink, gloss varnish and colored photo-sensitive resist.

Optionally, there are one or more through holes in the light shielding layer, one end of which contact the trace of the touch control unit, and the one or more through holes extend along the normal direction of the first surface.

Further, the conductor extends on the light shielding layer and is embedded in the one or more through holes, and the part of the conductor which is in the through hole(s) is connected to the trace of the touch control unit.

Further, the invention provides a method for manufacturing the capacitive touch panel, characterized in that the method includes:

Step 1, forming the touch control unit and the trace of the touch control unit on the substrate;

Step 2, forming the light shielding layer on the substrate, in which there are the one or more through holes;

Step 3, forming the conductor, which is partly distributed in the one or more through holes.

Optionally, the invention provides a capacitive touch panel, wherein the conductor extends on the light shielding layer; there is conductive body in the one or more through holes and the conductor at least partly covers the conductive body and is electrically connected to the trace of the touch control unit via the conductive body.

Further, the invention provides a method for manufacturing the capacitive touch panel, characterized in that the method includes:

Step 1, forming the touch control unit and the trace of the touch control unit on the substrate;

Step 2, forming the light shielding layer on the substrate, in which there are the one or more through holes;

Step 3, distributing the conductive body into the one or more through holes, and forming the conductor.

Optionally, the invention provides a capacitive touch panel, wherein the conductive body is distributed outside of the one or more through holes as well, and the part of the conductive body which is outside of the one or more through holes contacts with the conductor.

Further, the invention provides a method for manufacturing the capacitive touch panel, characterized in that the method includes:

Step 1, forming the touch control unit and the trace of the touch control unit on the substrate;

Step 2, forming the light shielding layer on the substrate, in which there are the one or more through holes;

Step 3, forming the conductor and the conductive body.

Further, the material of the conductive body is anyone of carbon paste, silver paste and anisotropic conductive adhesive or a mixture of any two or three of carbon paste, silver paste and anisotropic conductive adhesive.

Further, the material of the conductor is anyone of carbon paste and silver paste or a mixture of carbon paste and silver paste.

Optionally, the invention provides a capacitive touch panel, wherein the conductor is an anisotropic conductive film; the anisotropic conductive film is conductive along the direction perpendicular to the first surface and not conductive along the direction parallel to the first surface; there is an opening in the light shielding layer, at least part of the conductor is embedded in the opening to contact with the trace of the touch control unit; the conductor contacts with the first surface of the substrate.

Further, the opening consists of one hole or multiple holes.

Further, the color of the conductor is same with the color of the light shielding layer.

Further, the anisotropic conductive film is a layer of ACP.

Further, the invention provides a method for manufacturing the capacitive touch panel, characterized in that the method includes:

Step 1, forming the touch control unit and the trace of the touch control unit on the substrate;

Step 2, forming the light shielding layer on the substrate, in which there is the opening;

Step 3, forming the conductor.

Optionally, the invention provides a capacitive touch panel, including a second light shielding layer; the conductor partly covers the light shielding layer, the second light shielding layer partly covers the trace of the touch control unit and the conductor, and the second light shielding layer at least partly covers the light shielding layer; the second light shielding layer is insulating.

Further, the invention provides a method for manufacturing the capacitive touch panel, characterized in that the method includes:

Step 1, forming the touch control unit and the trace of the touch control unit on the substrate;

Step 2, forming the light shielding layer on the substrate;

Step 3, forming the conductor;

Step 4, forming the second light shielding layer.

Further, the second light shielding layer is formed by anyone of colored ink, gloss varnish and colored photosensitive resist.

Further, the color of the light shielding layer is same with the color of the second light shielding layer.

Further, the material of the conductor is anyone of carbon paste and silver paste or a mixture of carbon paste and silver paste, the color of the conductor is same with the color of the light shielding layer and the second light shielding layer.

Optionally, the invention provides a capacitive touch panel, wherein the capacitive touch panel includes conductive body, there are one or more through holes in the light shielding layer; one end of the conductive body contacts with the trace of the touch control unit and the other end of the conductive body contacts with the one or more through holes; the conductor extends on the light shielding layer and passes through the one or more through holes to contact with the conductive body.

Further, the trace of the touch control unit does not contact with an edge of the one or more holes; the conductor is partly distributed in the one or more through holes and the part of the conductor which is in the one or more through holes contacts with the conductive body; the conductor is electrically connected to the trace of the touch control unit via the conductive body.

Further, the invention provides a method for manufacturing the capacitive touch panel, characterized in that the method includes:

Step 1, forming the touch control unit and the trace of the touch control unit on the substrate;

Step 2, forming the conductive body on the trace of the touch control unit;

Step 3, forming the light shielding layer on the substrate, in which there are the one or more through holes;

Step 4, forming the conductor, which is partly distributed in the one or more through holes, and the conductor contacts with the conductive body.

Further, the material of the conductive body is anyone of carbon paste, silver paste and anisotropic conductive adhesive or a mixture of any two or three of carbon paste, silver paste and anisotropic conductive adhesive; the material of the conductor is silver paste; the color of the conductive body is same with the color of the light shielding layer.

Further, the substrate is anyone of tempered glass sheet, hardened glass sheet, glass sheet and transparent polymer sheet.

Further, the touch control unit and the trace of the touch control unit are patterned conductive film.

Optionally, the conductive film is a transparent conductive film, which is anyone of ITO film, graphene film and CNT film.

Optionally, the conductive film is formed by anyone of metal mesh and silver nanowires.

Further, the capacitive touch panel includes a second insulating layer, which covers the conductor.

Further, part of the conductor which is to be connected to a control circuit of the capacitive touch panel is an extracting part of the conductor, the extracting part of the conductor is not covered by the second insulating layer.

In the first preferred embodiment of the invention, an OGS capacitive touch panel and a method for manufacturing same is provided. The capacitive touch panel includes a substrate, multiple touch control units, a light shielding layer, multiple conductors and multiple traces of the touch control units. Wherein the light shielding layer is on the periphery of the capacitive touch panel; the multiple touch control units are arranged as an array of touch control units; on the first surface of the substrate each trace of the touch control unit extends from individual touch control unit; the light shielding layer partly covers each trace of the touch control unit, and in the part of the light shielding layer which covers the part of the trace of the touch control unit that overlaps the conductor in the normal direction of the first surface there are one or more through holes; the two ends of the through hole contact with the trace of the touch control unit and the conductor respectively; a conductive body is distributed in the through hole, and each conductor is electrically connected to individual trace of the touch control unit via the conductive body in the individual through hole. The method for manufacturing the OGS capacitive touch panel mainly includes the steps of: forming the touch control units and the traces of the touch control units on the substrate by the processes of photolithography and etching or the process of screen printing; forming the light shielding layer with through holes on the substrate by the process of screen printing; and distributing the conductive bodies into the through holes and forming the conductors by the process of screen printing.

In the second preferred embodiment of the invention, an OGS capacitive touch panel and a method for manufacturing same is provided. The capacitive touch panel includes a substrate, multiple touch control units, a light shielding layer, multiple conductors and multiple traces of the touch control units. Wherein the light shielding layer is on the periphery of the capacitive touch panel; the multiple touch control units are arranged as an array of touch control units; on the first surface of the substrate each trace of the touch control unit extends from individual touch control unit; there are openings in the light shielding layer, and each conductor is electrically connected to individual trace of the touch control unit in individual opening in the light shielding layer; the material of the conductors is ACP, and the conductors are conductive along the direction perpendicular to the first surface and not conductive along the direction parallel to the first surface. The method for manufacturing the OGS capacitive touch panel mainly includes the steps of: forming the touch control units and the traces of the touch control units on the substrate by the processes of photolithography and etching or the process of screen printing; forming the light shielding layer on the substrate by the process of screen printing; and forming the conductors by the process of screen printing.

In the third preferred embodiment of the invention, an OGS capacitive touch panel and a method for manufacturing same is provided. The capacitive touch panel includes a substrate, multiple touch control units, a light shielding layer, a conductor and multiple traces of the touch control units. Wherein the light shielding layer is on the periphery of the capacitive touch panel; the multiple touch control units are arranged as an array of touch control units; on the first surface of the substrate each trace of the touch control unit extends from individual touch control unit; there is one openings in the light shielding layer, and the conductor is electrically connected to each trace of the touch control unit in the opening in the light shielding layer; the material of the conductor is ACP, and the conductor is conductive along the direction perpendicular to the first surface and not conductive along the direction parallel to the first surface. The method for manufacturing the OGS capacitive touch panel mainly includes the steps of: forming the touch control units and the traces of the touch control units on the substrate by the processes of photolithography and etching or the process of screen printing; forming the light shielding layer on the substrate by the process of screen printing; and forming the conductor by the process of screen printing.

In the forth preferred embodiment of the invention, an OGS capacitive touch panel and a method for manufacturing same is provided. The capacitive touch panel includes a substrate, multiple touch control units, a light shielding layer, a second light shielding layer, multiple conductors and multiple traces of the touch control units. Wherein the light shielding layer and the second light shielding layer are on the periphery of the capacitive touch panel; the multiple touch control units are arranged as an array of touch control units; on the first surface of the substrate each trace of the touch control unit extends from individual touch control unit; the light shielding layer partly covers each trace of the touch control unit; the conductors partly cover the light shielding layer and are electrically connected to the traces of the touch control units where the traces of the touch control units are not covered by the light shielding layer; the second light shielding layer partly covers the traces of the touch control units and the conductors, and covers the light shielding layer while partly exposing individual conductor. The method for manufacturing the OGS capacitive touch panel mainly includes the steps of: forming the touch control units and the traces of the touch control units on the substrate by the processes of photolithography and etching or the process of screen printing; forming the light shielding layer by the process of screen printing; forming the conductors by the process of screen printing; and forming the second light shielding layer by the process of screen printing.

In the fifth preferred embodiment of the invention, an OGS capacitive touch panel and a method for manufacturing same is provided. The capacitive touch panel includes a substrate, multiple touch control units, a light shielding layer, multiple conductors and multiple traces of the touch control units. Wherein the light shielding layer is on the periphery of the capacitive touch panel; the multiple touch control units are arranged as an array of touch control units; on the first surface of the substrate each trace of the touch control unit extends from individual touch control unit; the light shielding layer partly covers each trace of the touch control unit, and in the light shielding layer covering the traces of the touch control units there are one or more through holes; one end of the through hole contacts with the traces of the touch control units; there is conductive body in the through hole, and the conductive body is distributed outside the through hole as well, the conductive body which is outside of the through hole partly covers the conductor; each conductor is electrically connected to individual trace of the touch control unit via the conductive body. The method for manufacturing the OGS capacitive touch panel mainly includes the steps of: forming the touch control units and the traces of the touch control units on the substrate by the processes of photolithography and etching or the process of screen printing; forming the light shielding layer with through holes on the substrate by the process of screen printing; forming the conductors on the light shielding layer by the process of screen printing; and distributing the conductive bodies into the through holes and onto the conductors by the process of screen printing.

In the sixth preferred embodiment of the invention, an OGS capacitive touch panel and a method for manufacturing same is provided. The capacitive touch panel includes a substrate, multiple touch control units, a light shielding layer, multiple conductors, multiple traces of the touch control units and multiple conductive bodies. Wherein the multiple touch control units are arranged as an array of touch control units; on the first surface of the substrate each trace of the touch control unit extends from individual touch control unit; the light shielding layer is on the periphery of the capacitive touch panel and has multiple through holes in it; each trace of the touch control unit extends to the individual through hole and is covered by the individual conductive body there; each conductor is distributed on the light shielding layer and part of it is distributed in individual through hole, each conductor is electrically connected to individual trace of the touch control unit via individual conductive body at individual through hole. The method for manufacturing the OGS capacitive touch panel mainly includes the steps of: forming the touch control units and the traces of the touch control units on the substrate by the processes of photolithography and etching or the process of screen printing; forming the conductive bodies on the traces of the touch control units by the process of screen printing; forming the light shielding layer with through holes by the process of screen printing; and forming the conductors on the light shielding layer by the process of screen printing.

It can be understood that in the OGS capacitive touch panel and the method for manufacturing same of the invention, the traces of the touch control units are sandwiched between the substrate and the light shielding layer, which facilitates arranging the process of forming the light shielding layer after the process of forming the touch control units and the traces of the touch control units. So when the traces of the touch control units extend on the substrate, they are not required to get over the step between the substrate and the light shielding layer as what they have to do in the prior art. The problem of a complicated and difficult process in the prior art is resolved, which is aroused by the requirement of the traces of the touch control unit getting over the step between the substrate and the light shielding layer and by the usage of a light shielding layer of high-temperature resistant material. Besides, the light shielding layer covering the traces of the touch control unit in the invention of the OGS capacitive touch panel can protect the traces of the touch control units to enhance the reliability of the OGS capacitive touch panel. In the invention the process of forming the light shielding layer is arranged after the process of forming the touch control units and the traces of the touch control units to relieve the effect of the temperature of the afterwards processes acting on the light shielding layer, the color and the property of the light shielding layer is less prone to changing, and the difficulty in coating process is avoided. The OGS capacitive touch panel of the invention has a simple structure and is reliable and low-cost, and the method for manufacturing the OGS capacitive touch panel of the invention has less process and is simple and easy to carry on.

Referencing now to the figures, the conception, detailed structure and induced technical effect of the present invention will be expounded for due understanding of the purpose, characterizations and effects of the present invention.

DETAILED DESCRIPTION OF THE PREFERRED EMBODIMENTS

Figure 1:
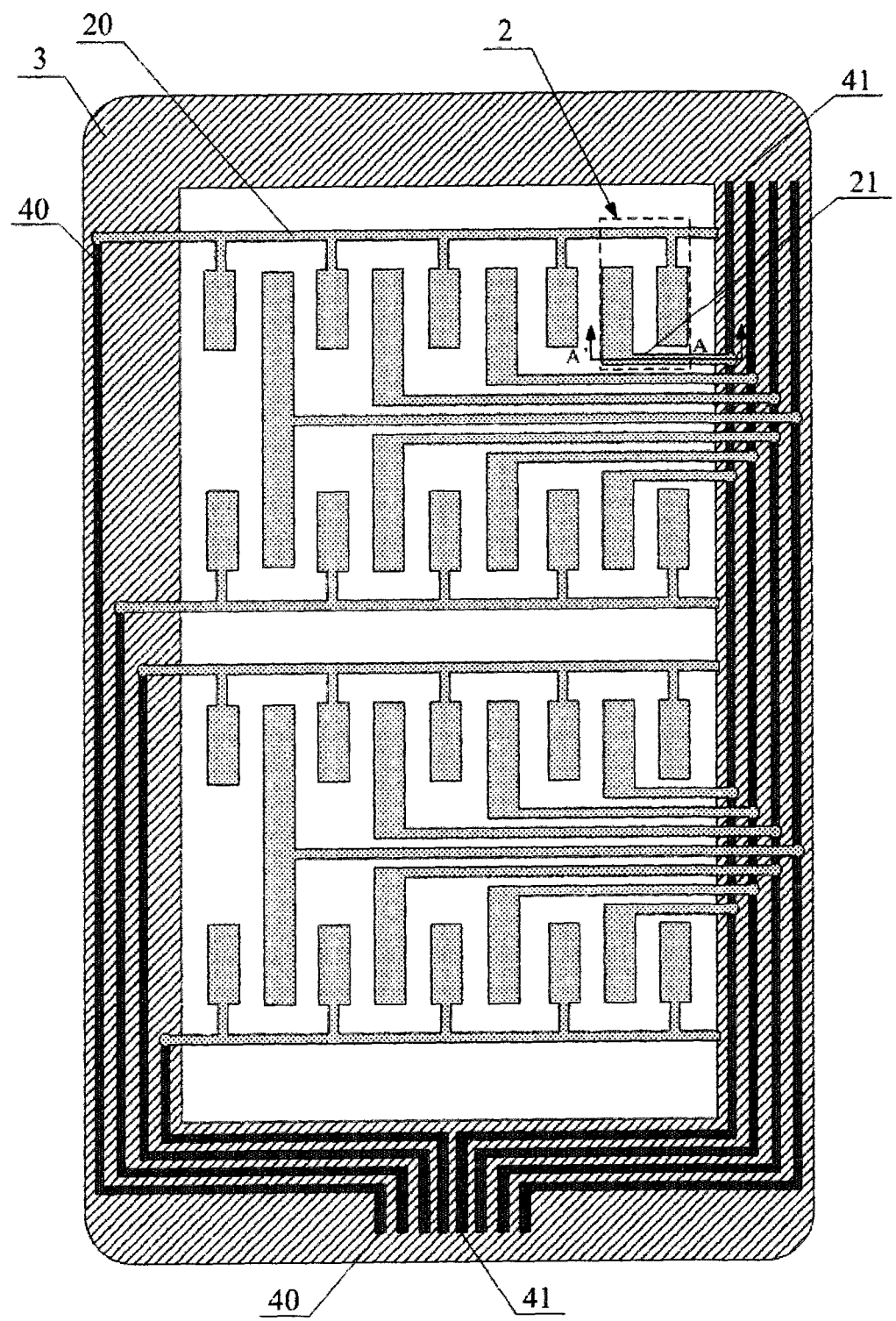
FIG. 1 shows schematically the front view of the OGS capacitive touch panel of the prior art.
Figure 2:
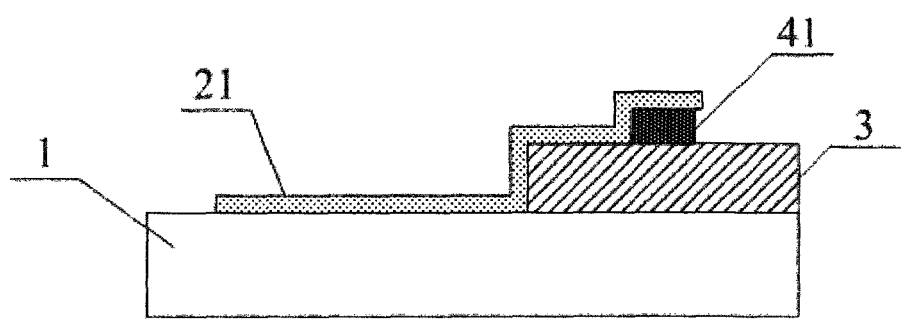
FIG. 2 is the section view of the capacitive panel shown in FIG. 1 along AA' direction.
Figure 3:
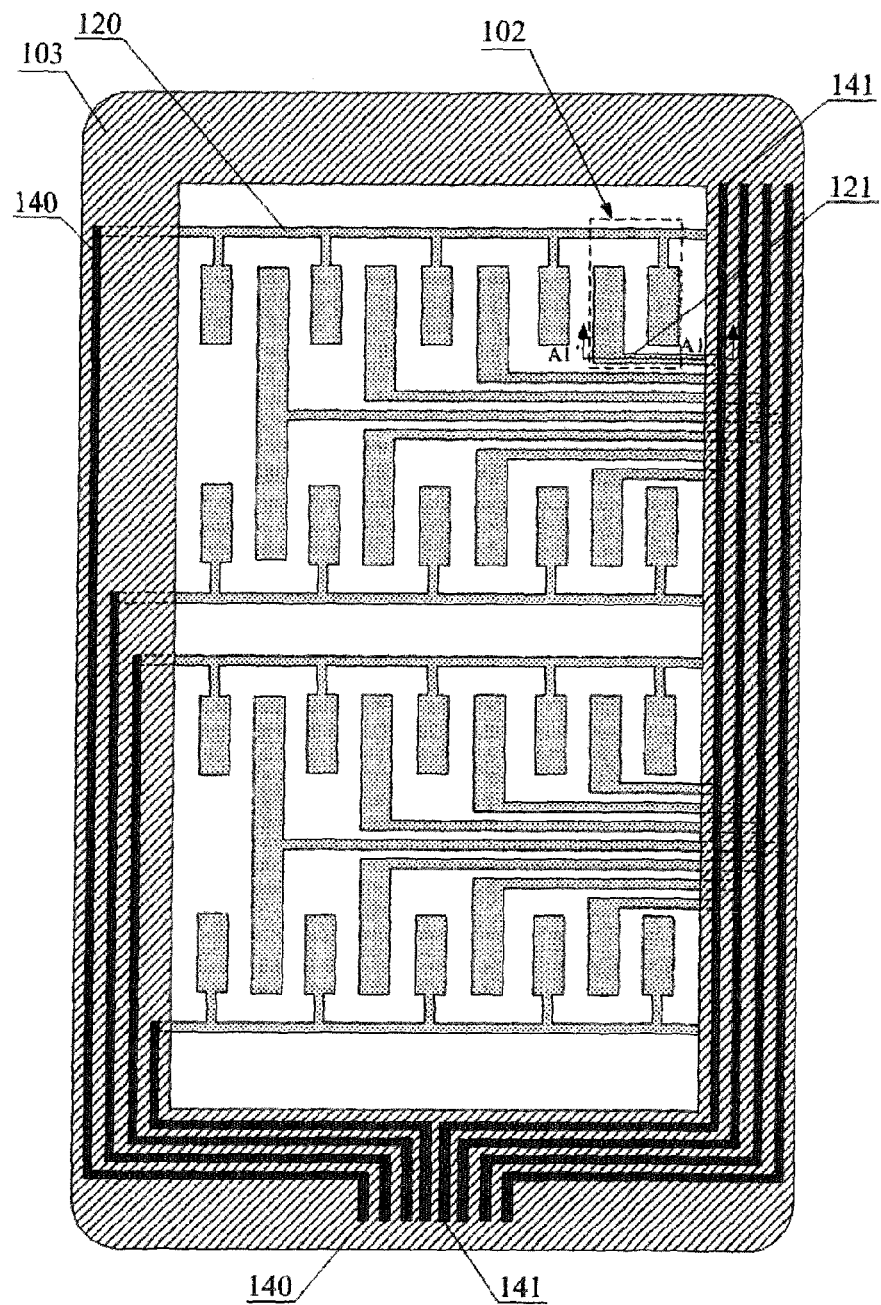
FIG. 3 shows schematically the front view of the OGS capacitive touch panel of the invention in the first embodiment, wherein the parts of the traces of the touch control units covered by the light shielding layer are indicated by dashed lines.
Figure 4:
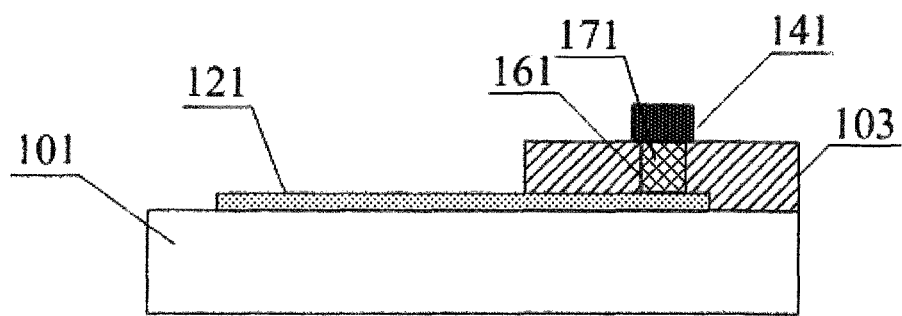
FIG. 4 is the section view of the capacitive panel shown in FIG. 3 along A1A1' direction.
Figure 6:
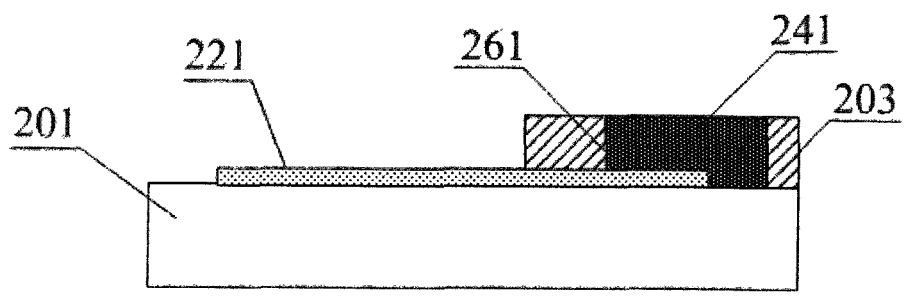
FIG. 6 is the section view of the capacitive panel shown in FIG. 5 along A2A2' direction.

As shown in FIGS. 3 and 4, in the first preferred embodiment, the OGS capacitive touch panel of the invention includes a substrate 101, multiple touch control units such as the touch control unit 102, a light shielding layer 103, multiple conductors such as the conductors 140 and 141, and multiple traces of the touch control units. Wherein the touch control unit consists of a driving part and a sensing part, for instance, the touch control unit 102 consists of a driving part and a sensing part; the light shielding layer 103 is an insulating layer, and is distributed on the periphery of the capacitive touch panel; the multiple touch control units are arranged as an array of touch control units on the first surface of the substrate 101 and in the active area of the capacitive touch panel; on the first surface of the substrate 101 each trace of the touch control units extends from individual touch control unit to the periphery of the capacitive touch panel, for example, the trace 120 of the touch control unit extends from the driving part of the touch control unit 102 and the trace 121 of the touch control unit extends from the sensing part of the touch control unit 102; from the first surface of the substrate 101 on and in the normal direction of the first surface, the light shielding layer 103, the conductors and the traces of the touch control units are arranged in the order of the traces of the touch control units, the first surface the light shielding layer 103 and the conductors, wherein the normal direction of the first surface of the substrate 101 in FIG. 3 is perpendicularly outward from the paper and in FIG. 4 it is upward; the light shielding layer 103 partly covers each trace of the touch control units (here the term "cover" is based on the normal direction of the first surface of the substrate 101, specifically, the upper layer covers the lower layer when the normal direction of the first surface is upward; the explanation on the term "cover" applies to the other parts of the description), specifically, the parts of the traces of the touch control units which is in the active area are not covered by the light shielding layer 103, besides, the parts of the traces of the touch control units which overlap the conductor in the normal direction of the first surface are partly covered by the light shielding layer 103; in the embodiment, and in the part of the light shielding layer 103 which covers the parts of the traces of the touch control units that overlap the conductor in the normal direction of the first surface there are one or more through holes, that is to say that there are one or more through holes in the part of the light shielding layer 103 which is sandwiched between the conductors and the traces of the touch control units in the normal direction of the first surface, as shown in FIG. 4, there is a through hole 161 in the part of the light shielding layer 103 which is sandwiched between the conductor 141 and the trace 121 of the touch control unit; the through holes are sandwiched between the traces of the touch control units and the conductors, preferably, the two ends of a through hole contact with the trace of the touch control unit and the conductor respectively, as shown in FIG. 4, one end (the bottom end) of the through hole 161 contacts with the trace 121 of the touch control unit and the other end (the top end) contacts with the conductor 141; there is a conductive body in a through hole, and the conductive body contacts with a conductor and a trace of a touch control unit, each conductor is electrically connected to individual trace of the touch control unit via the conductive body in the individual through hole, as shown in FIG. 6, there is a conductive body 171 in the through hole 161, and the conductive body 171 contacts with the conductor 141 and the trace 121 of the touch control unit, the conductor 141 is electrically connected to the trace 121 of the touch control unit via the conductive body 171 in the through hole 161. It should be understood that there might be part of the conductive body distributed outside of the through hole due to the process which fills the conductive body into the through hole (for example, the alignment error in screen printing), and in this situation, the top end of the through hole might not contact with the conductor. In the case of multiple through holes existing in the part of the light shielding layer 103 which is sandwiched between the conductors and the traces of the touch control units in the normal direction of the first surface, for example, in the case of multiple through holes existing in the part of the light shielding layer 103 which is sandwiched between the conductor 141 and the trace 121 of the touch control unit, which is similar to the case of one through hole described above, the bottom ends of these through holes contact with the trace of the touch control unit, there is conductive body in one or more of the through holes, the conductive body contacts with the trace of the touch control unit and the conductor is electrically connected to the trace of the touch control unit via the conductive body in at least one through hole.

In the embodiment, the material of the conductive body can be carbon paste, silver paste or a mixture of carbon paste and silver paste and its color is same with the color of the light shielding layer 103 (here the two same color means that the color difference between the two color is relatively small, for example, the color difference ΔE, which is calculated with the color difference formula in the color space of CIE1976(L*a*b*) for example, is not more than 6 and preferably not more than 3, the explanation also applies to the other parts of the description); the light shielding layer 103 can be a layer of colored ink, gloss varnish or colored photo-sensitive resist, that is to say that the material of the light shielding layer 103 can be colored ink, gloss varnish or colored photo-sensitive resist; the substrate 101 can be a tempered glass sheet, hardened glass sheet or general glass sheet, or be a transparent polymer sheet; the touch control units and the traces of the touch control units are patterned conductive film, which can be an ITO film, a layer of graphene, CNT, silver nanowires, metal mesh or other conductive material, that is to say the material of the conductive film can be ITO, graphene, CNT, silver nanowires, metal mesh or other conductive material; the material of the conductors can be anyone of carbon paste and silver paste or a mixture of carbon paste and silver paste, specifically, its material can be carbon paste, silver paste or a mixture of carbon paste and silver paste when the conductor is short, and its material preferably is silver paste when the conductor is long, wherein "the conductor is short" means that the length of the conductor between the point where it connects to the trace of the touch control unit and the point where it connects to the control circuit of the capacitive touch panel is not more than 5 mm, and "the conductor is long" means that the length is greater than 5 mm.

The specific steps to manufacture the capacitive panel of the embodiment are as follows:

Step one, forming the touch control units and the traces of the touch control units on the substrate 101.

In the embodiment we take the one-layered transparent conductive film process, by which the touch control units and the traces of the touch control units are formed with the same layer of transparent conductive film, as an example to illustrate.

Specifically, in the step, first take a glass sheet as the substrate 101, which can be a tempered glass sheet, hardened glass sheet or general glass sheet, or be a transparent polymer sheet; then clean the substrate 101 and choose one surface of the clean substrate 101 as the first surface; then deposit a layer of transparent conductive film on the first surface of the substrate 101, in the embodiment the deposited film is ITO film whose thickness is 15-40 nm, or 5-15 nm, or 40-60 nm; then coat the ITO film with a layer of photosensitive resist, develop the layer to form the pattern of the touch control units and the traces of the touch control units, in the embodiment the lithography process is applied; finally, etch the ITO film the pattern of the touch control units and the traces of the touch control units, and remove the photosensitive resist, the touch control units and the traces of the touch control units are formed on the first surface of the substrate 101. Besides, the process of screen printing can be applied to form the conductive film which is patterned as the touch control units and the traces of the touch control units on the first surface of the substrate 101 directly, to form the touch control units and the traces of the touch control units on the first surface of the substrate 101.

Step two, form the light shielding layer 103 on the substrate 101.

Specifically, apply the process of screen printing to form the light shielding layer 103 on the first surface of the substrate 101, which is patterned as the black matrix of the capacitive touch panel and has through holes in it; the through hole extends along the normal direction of the first surface and one of its end contacts with a trace of a touch control unit and another end contacts with a conductor. As shown in FIG. 4, in the part of the light shielding layer 103 which is sandwiched between the conductor 141 and the trace 121 of the touch control unit there is a through hole 161. In the embodiment, the light shielding layer 103 is formed by colored ink and its thickness is 1-40 μm, the diameter of the through hole is 0.1-0.6 mm. Besides, the shape of the cross section (the section parallel to the first surface) of the through hole is not limited to circle and can be rectangular, elliptical, and etc.

Step three, distribute the conductive body into the through holes, then form the conductors.

Specifically, apply the process of screen printing to fill the material of the conductive body into each through hole which are formed in the previous step, in the embodiment, the material of the conductive body is carbon paste whose color is same with the color of the light shielding layer 103; the height of the filled conductive body is 1-100 μm and preferably is same with the thickness of the light shielding layer 103. Then apply the process of screen printing to form each conductor on the light shielding layer 103. In the embodiment, the material of the conductors is silver paste and the thickness of the conductor is 5-40 μm. Besides, the conductors can be formed by the process of laser etching, which is specifically as following: forming a layer of silver paste with a desired thickness on the light shielding layer 103, laser etching the layer of silver paste to form each conductor on the light shielding layer 103.

It should be understood that when the material of the conductors is same with the material of the conductive body which is to be filled into the through holes, the material of the conductive body can be filled into the through hole and at the same time the conductors are formed by applying the process of screen printing once or by combining the process of screen printing and the process of laser etching, while preferably the color of the conductors is same with the color of the light shielding layer 103. This method is especially suitable for the case of relatively small through holes, for example the diameter of the through hole (or the length of the side of a rectangular through hole, the length of the long axis of an elliptic through hole) is not more than 0.1 mm.

In the case of small through holes, for example when the diameter of the through hole (or the length of the side of a rectangular through hole, or the length of the long axis of an elliptic through hole) is not more than 0.2 mm, the color difference ΔE between the conductive body (or the conductors) and the light shielding layer 103 is preferably not more than 6; and when the diameter of the through hole is not more than 0.05 mm, the color difference ΔE is preferably not more than 10, or even the conductive body (or the conductors) and the light shielding layer 103 can have totally different color. When the diameter of the through hole (or the length of the side of a rectangular through hole, or the length of the long axis of an elliptic through hole) is greater than 0.2 mm, the color difference ΔE between the conductive body (or the conductors) and the light shielding layer 103 is preferably not more than 3.

Finally, the conductors can be covered by an insulating layer to be prevented from oxidizing when being exposed in air. The insulating layer covers the entire conductors except for their extracting parts. The insulating layer is formed by one or more of colored ink, gloss varnish and colored photo-sensitive resist and patterned as the shape of the black matrix of the capacitive touch panel or patterned to cover the conductors only.

Figure 5:
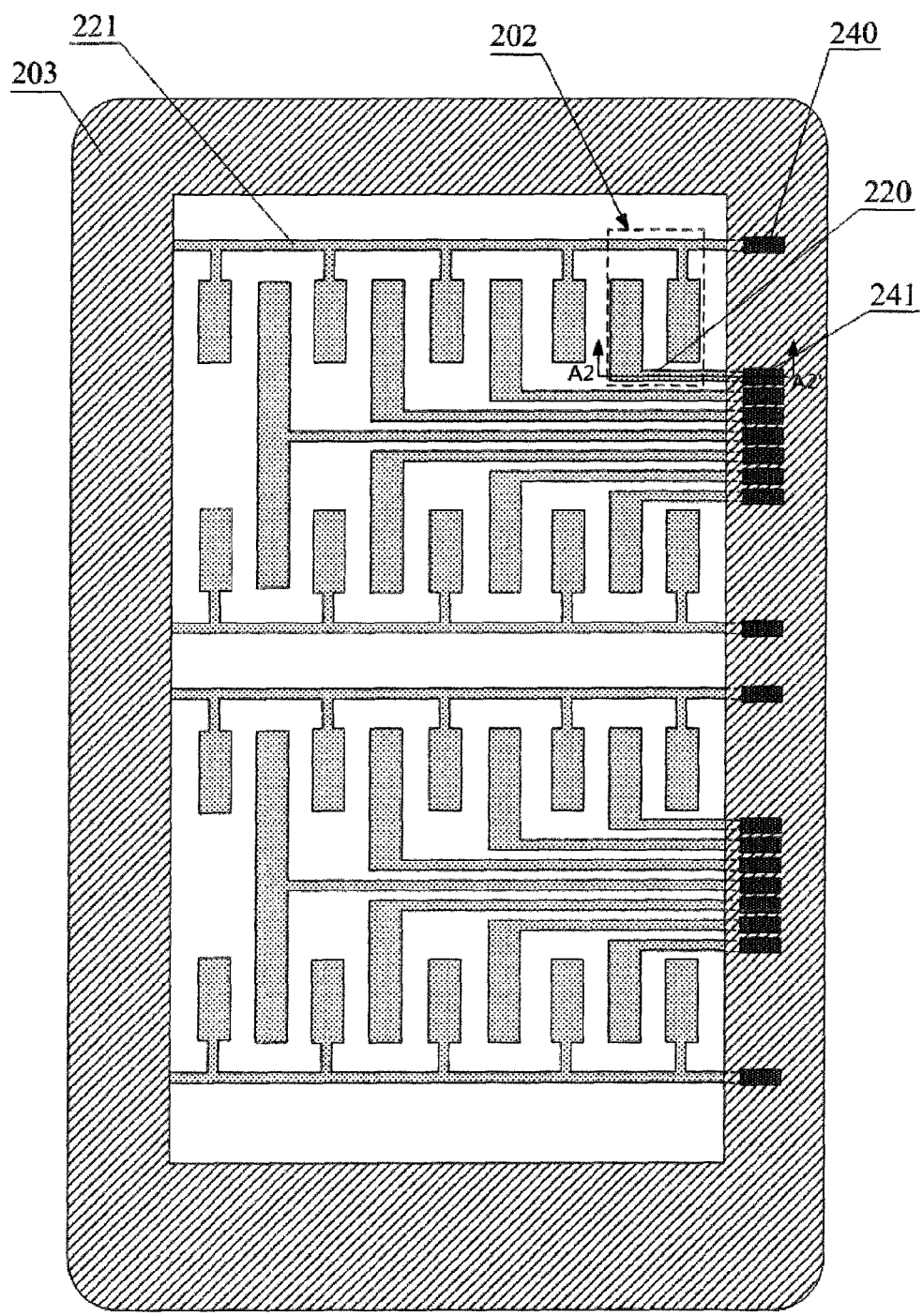
FIG. 5 shows schematically the front view of the OGS capacitive touch panel of the invention in the second embodiment, wherein the parts of the traces of the touch control units covered by the light shielding layer are indicated by dashed lines.

As shown in FIGS. 5 and 6, in the second preferred embodiment, the OGS capacitive touch panel of the invention includes a substrate 201, multiple touch control units such as the touch control unit 202, a light shielding layer 203, multiple conductors such as the conductors 240 and 241, and multiple traces of the touch control units. Wherein the touch control unit consists of a driving part and a sensing part, for instance, the touch control unit 202 consists of a driving part and a sensing part; the multiple touch control units are arranged as an array of touch control units on the first surface of the substrate 201 and in the active area of the capacitive touch panel; on the first surface of the substrate 201 each trace of the touch control units extends from individual touch control unit, for example, the trace 220 of the touch control unit extends from the driving part of the touch control unit 202 and the trace 221 of the touch control unit extends from the sensing part of the touch control unit 202; the light shielding layer 203 partly covers each trace of the touch control units, specifically, the parts of the traces of the touch control units which are in the active area are not covered by the light shielding layer 203, besides, the parts of the traces of the touch control units which overlap the conductors in the normal direction of the first surface are not covered by the light shielding layer 203, the normal direction of the first surface of the substrate 201 in FIG. 5 is perpendicularly outward from the paper and in FIG. 6 it is upward; in the embodiment, the light shielding layer 203 is an insulating layer and is distributed on the periphery of the capacitive touch panel, there are openings in it and the bottom edge of an opening contacts with a trace of a touch control unit, for instance, the bottom edge of the opening 261 shown in FIG. 6 contacts with the trace 221 of the touch control unit; each conductor is arranged on the periphery of the capacitive touch panel and at least partly distributed in a corresponding opening to contact with a corresponding trace of a touch control unit, to electrically connected to the corresponding trace of the touch control unit, for instance, the conductor 241 shown in FIGS. 5 and 6 is partly distributed in the opening 261 to contact with and electrically connected to the trace 221 of the touch control unit. What shown in FIG. 6 is the case of one opening corresponding to one trace of a touch control unit and one conductor, and the opening is a through hole whose bottom edge contacts with the trace of the touch control unit, and the conductor is at least partly distributed in the opening to contacts with the trace of the touch control unit; it should be understood that the opening can consist of multiple separate through holes parallel to each other whose bottom edges contact with the trace of the touch control unit, and the conductor is at least partly distributed in one or more of the through holes to contact with the trace of the touch control unit. In the following, the former opening which consists of one through hole is named as one-hole opening, and the latter which consists of multiple through holes is named as multi-hole opening.

In the embodiment, the material of the conductors is ACP (Anisotropic conductive paste) or other anisotropic conductive film, which is conductive along the direction perpendicular to the first surface of the substrate 201 and not conductive along the direction parallel to the first surface of the substrate 201, and its color is same with that of the light shielding layer 203; the light shielding layer 203 can be a layer of colored ink, gloss varnish or colored photo-sensitive resist, that is to say that the material of the light shielding layer 203 can be colored ink, gloss varnish or colored photo-sensitive resist; the substrate 201 can be a tempered glass sheet, hardened glass sheet or general glass sheet, or be a transparent polymer sheet; the touch control units and the traces of the touch control units are patterned conductive film, which can be an ITO film, a layer of graphene, CNT, silver nanowires, metal mesh or other conductive material, that is to say the material of the conductive film can be ITO, graphene, CNT, silver nanowires, metal mesh or other conductive material. It should be noted that in the embodiment the length of the conductor is relatively short, so attention should be paid to the soldering, bonding or hot pressure welding position when connect the conductors to the control circuit of the capacitive touch panel by way of soldering, bonding or hot pressure welding, to ensure the electrically connection between the control circuit and the traces of the touch control units via the conductors, for example, the soldering, bonding or hot pressure welding position should be at the part of a conductor which overlap a corresponding trace of a touch control unit in the normal direction of the first surface.

The specific steps to manufacture the capacitive panel of the embodiment are as follows:

Step one, forming the touch control units and the traces of the touch control units on the substrate 201.

In the embodiment we take the one-layered transparent conductive film process, by which the touch control units and the traces of the touch control units are formed with the same layer of transparent conductive film, as an example to illustrate.

Specifically, in the step, first take a glass sheet as the substrate 201, which can be a tempered glass sheet, hardened glass sheet or general glass sheet, or be a transparent polymer sheet; then clean the substrate 201 and choose one surface of the clean substrate 201 as the first surface; then deposit a layer of transparent conductive film on the first surface of the substrate 201, in the embodiment the deposited film is ITO film whose thickness is 15-40 nm, or 5-15 nm, or 40-60 nm; then coat the ITO film with a layer of photosensitive resist, develop the layer to form the pattern of the touch control units and the traces of the touch control units, in the embodiment the lithography process is applied; finally, etch the ITO film the pattern of the touch control units and the traces of the touch control units, and remove the photosensitive resist, the touch control units and the traces of the touch control units are formed on the first surface of the substrate 201. Besides, the process of screen printing can be applied to form the conductive film which is patterned as the touch control units and the traces of the touch control units on the first surface of the substrate 201 directly, to form the touch control units and the traces of the touch control units on the first surface of the substrate 201.

Step two, form the light shielding layer 203 on the substrate 201.

Specifically, apply the process of screen printing to form the light shielding layer 203 on the first surface of the substrate 201, which is patterned as the black matrix of the capacitive touch panel and has openings in it, the opening can be one-hole opening or multi-hole opening; the opening contains at least part of a conductor, as shown in FIG. 6, in light shielding layer 203 there is an opening 261, which is to contain the conductor 241. In the embodiment, the light shielding layer 203 is formed by colored ink and its thickness is 5-40 μm, and the length and width of the opening is equal to or a little (for example, under 30%) greater than the length and width of the conductor which is to be contained in the opening, thus the opening can contain the conductor suitably. The height of the opening can be greater or smaller than the height of the conductor, or equal to the height of the conductor, for example, the opening 261 contains the conductor 241. In other embodiments, the opening can contain only part of the conductor. Besides, the shape of the cross section (the section parallel to the first surface) of the opening is not limited to rectangular and can be circle, elliptical, and etc.

Step three, form the conductors.

Specifically, apply the process of screen printing to form the conductors, each of which is at least partly distributed in a corresponding opening. In the embodiment, the conductors are formed by ACP and are conductive along the direction perpendicular to the first surface of the substrate 201 and not conductive along the direction parallel to the first surface of the substrate 201. The thickness of each conductor is 5-40 μm, and its cross section (the section parallel to the first surface) is rectangular. Besides, the cross section of the conductor is not limited to rectangular and can be circle, elliptical, and etc.

The color of the conductor contained in the opening is same with that of the light shielding layer 203. It should be understood that when the opening is multi-hole opening and the through holes of which the opening consists are relatively small, for example, when the diameter of the through hole (or the length of the side of a rectangular through hole, or the length of the long axis of an elliptic through hole) is not more than 0.2 mm, the color difference $\Delta E$ between the conductor in the through hole and the light shielding layer 203 is preferably not more than 6; and when the diameter of the through hole (or the length of the side of a rectangular through hole, or the length of the long axis of an elliptic through hole) is not more than 0.05 mm, the color difference $\Delta E$ is preferably not more than 10, or even the conductor and the light shielding layer 203 can have totally different color. When the diameter of the through hole (or the length of the side of a rectangular through hole, the length of the long axis of an elliptic through hole) is greater than 0.2 mm, the color difference $\Delta E$ between the conductor and the light shielding layer 203 is preferably not more than 3.

Finally, the conductors can be covered by an insulating layer to be prevented from oxidizing when being exposed in air. The insulating layer covers the entire conductors except for their extracting parts. The insulating layer is formed by one or more of colored ink, gloss varnish and colored photo-sensitive resist and patterned as the shape of the black matrix of the capacitive touch panel or patterned to cover the conductors only.

Figure 7:
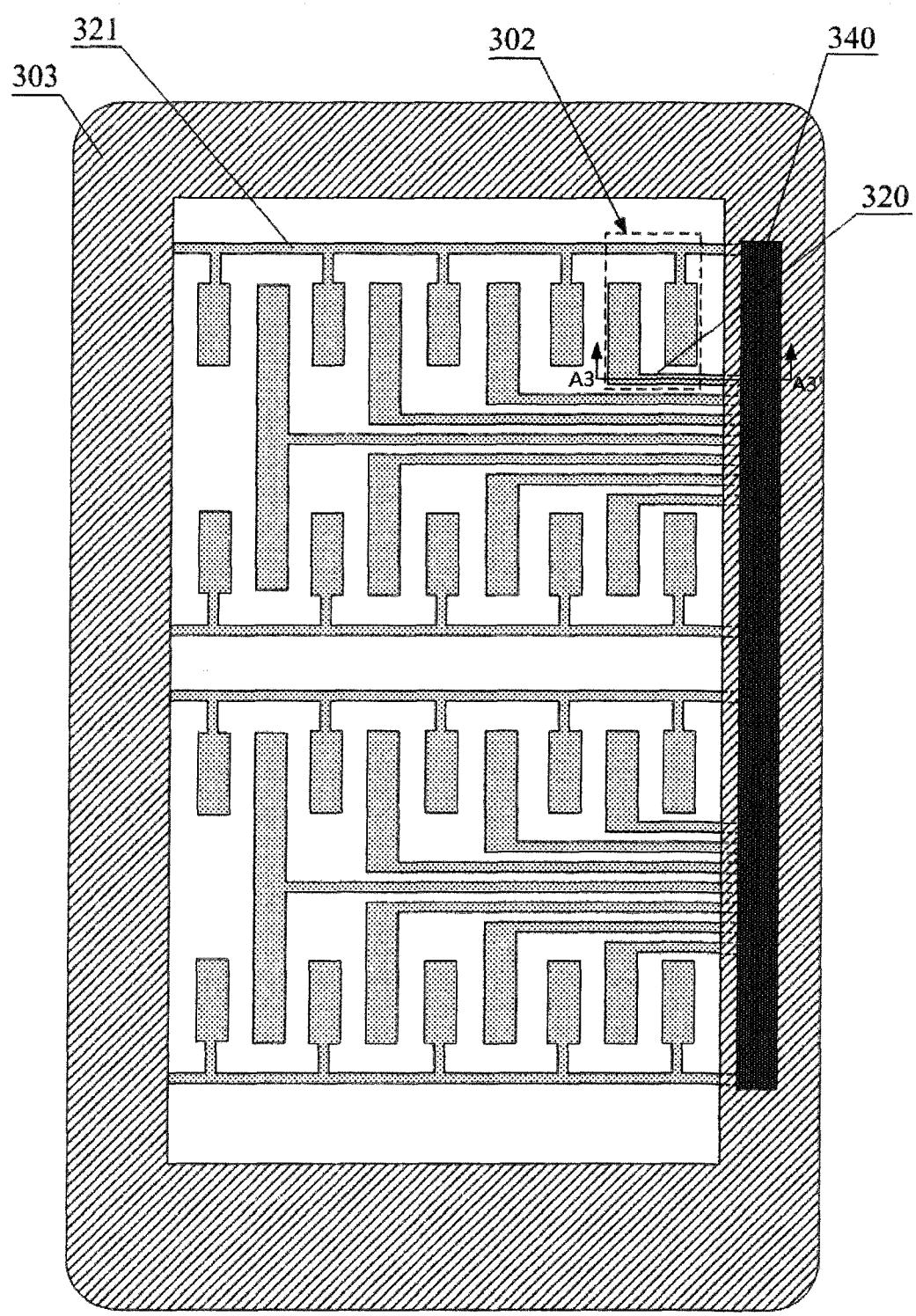
FIG. 7 shows schematically the front view of the OGS capacitive touch panel of the invention in the third embodiment, wherein the parts of the traces of the touch control units covered by the light shielding layer are indicated by dashed lines.
Figure 8:
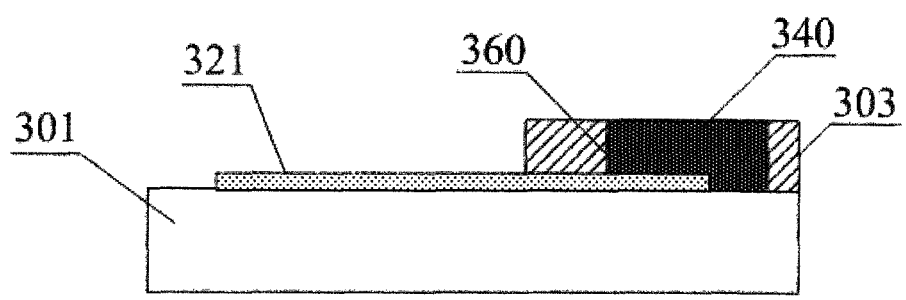
FIG. 8 is the section view of the capacitive panel shown in FIG. 7 along A3A3' direction.

As shown in FIGS. 7 and 8, in the third preferred embodiment, the OGS capacitive touch panel of the invention includes a substrate 301, multiple touch control units such as the touch control unit 302, a light shielding layer 303, a conductors 340 and multiple traces of the touch control units. Wherein the touch control unit consists of a driving part and a sensing part, for instance, the touch control unit 302 consists of a driving part and a sensing part; the multiple touch control units are arranged as an array of touch control units on the first surface of the substrate 301 and in the active area of the capacitive touch panel; on the first surface of the substrate 301 each trace of the touch control units extends from individual touch control unit, for example, the trace 320 of the touch control unit extends from the driving part of the touch control unit 302 and the trace 321 of the touch control unit extends from the sensing part of the touch control unit 302; the light shielding layer 303 partly covers each trace of the touch control units, specifically, the parts of the traces of the touch control units which are in the active area are not covered by the light shielding layer 303, besides, the parts of the traces of the touch control units which overlap the conductor in the normal direction of the first surface are not covered by the light shielding layer 303, the normal direction of the first surface of the substrate 301 in FIG. 7 is perpendicularly outward from the paper and in FIG. 8 it is upward; in the embodiment, the light shielding layer 303 is an insulating layer and is distributed on the periphery of the capacitive touch panel, there is one opening in it and the bottom edge of the opening contacts with the traces of the touch control units. Preferably, each trace of the touch control units has part of it exposed in the opening (the part that can be seen in the opening in the direction opposite to the normal direction of the first surface). For instance, each trace of the touch control units has part of it exposed in the opening 360. The conductor is arranged on the periphery of the capacitive touch panel and at least partly distributed in the opening 360 to contact with each trace of the touch control units, to electrically connected to each trace of the touch control units, for instance, the conductor 340 shown in FIG. 8 is partly distributed in the opening 360 to contact with and electrically connected to the traces of the touch control units such as the traces 320 and 321. What shown in FIG. 8 is the case of one opening corresponding to all traces of the touch control units and one conductor, the bottom edge of the opening contacts with each trace of the touch control units, and the conductor is at least partly distributed in the opening to contacts with each trace of the touch control units. The opening can be multi-hole opening as well, and the conductor is at least partly distributed in the through holes of which the opening consists, to contact with each trace of the touch control units. Specifically, each trace of the touch control units corresponds to a part of the through holes of which the multi-hole opening consists, and the conductor distributed in the part contacts with the trace of the touch control unit.

In the embodiment, the material of the conductor is ACP (Anisotropic conductive paste) or other anisotropic conductive film, which is conductive along the direction perpendicular to the first surface of the substrate 301 and not conductive along the direction parallel to the first surface of the substrate 301, and its color is same with that of the light shielding layer 303; the light shielding layer 303 can be a layer of colored ink, gloss varnish or colored photo-sensitive resist, that is to say that the material of the light shielding layer 303 can be colored ink, gloss varnish or colored photo-sensitive resist; the substrate 301 can be a tempered glass sheet, hardened glass sheet or general glass sheet, or be a transparent polymer sheet; the touch control units and the traces of the touch control units are patterned conductive film, which can be an ITO film, a layer of graphene, CNT, silver nanowires, metal mesh or other conductive material, that is to say the material of the conductive film can be ITO, graphene, CNT, silver nanowires, metal mesh or other conductive material. It should be noted that in the embodiment the width of the conductor is relatively short, so attention should be paid to the soldering, bonding or hot pressure welding position when connect the conductor to the control circuit of the capacitive touch panel by way of soldering, bonding or hot pressure welding, to ensure the electrically connection between the control circuit and the traces of the touch control units via the conductor, for example, the soldering, bonding or hot pressure welding position should be at the part of the conductor which overlap a corresponding trace of a touch control unit in the normal direction of the first surface.

The specific steps to manufacture the capacitive panel of the embodiment are as follows:

Step one, forming the touch control units and the traces of the touch control units on the substrate 301.

In the embodiment we take the one-layered transparent conductive film process, by which the touch control units and the traces of the touch control units are formed with the same layer of transparent conductive film, as an example to illustrate.

Specifically, in the step, first take a glass sheet as the substrate 301, which can be a tempered glass sheet, hardened glass sheet or general glass sheet, or be a transparent polymer sheet; then clean the substrate 301 and choose one surface of the clean substrate 301 as the first surface; then deposit a layer of transparent conductive film on the first surface of the substrate 301, in the embodiment the deposited film is ITO film whose thickness is 15-40 nm, or 5-15 nm, or 40-60 nm; then coat the ITO film with a layer of photosensitive resist, develop the layer to form the pattern of the touch control units and the traces of the touch control units, in the embodiment the lithography process is applied; finally, etch the ITO film the pattern of the touch control units and the traces of the touch control units, and remove the photosensitive resist, the touch control units and the traces of the touch control units are formed on the first surface of the substrate 301. Besides, the process of screen printing can be applied to form the conductive film which is patterned as the touch control units and the traces of the touch control units on the first surface of the substrate 301 directly, to form the touch control units and the traces of the touch control units on the first surface of the substrate 301.

Step two, form the light shielding layer 303 on the substrate 301.

Specifically, apply the process of screen printing to form the light shielding layer 303 on the first surface of the substrate 301, which is patterned as the black matrix of the capacitive touch panel and has one opening in it, the opening can be one-hole opening or multi-hole opening; the opening contains at least part of the conductor, as shown in FIG. 8, in light shielding layer 303 there is an opening 360, which is to contain the conductor 340. In the embodiment, the light shielding layer 303 is formed by colored ink and its thickness is 5-40 μm, and the length and width of the opening is equal to or a little (for example, under 30%) greater than the length and width of the conductor which is to be contained in the opening, thus the opening can contain the conductor suitably. The height of the opening can be greater or smaller than the height of the conductor, or equal to the height of the conductor, for example, the opening 360 contains the conductor 340. In other embodiments, the opening can contain only part of the conductor. Besides, the shape of the cross section (the section parallel to the first surface) of the opening is not limited to rectangular and can be circle, elliptical, and etc.

Step three, form the conductor.

Specifically, apply the process of screen printing to form the conductor, which is at least partly distributed in the opening. In the embodiment, the conductor is formed by ACP and is conductive along the direction perpendicular to the first surface of the substrate 301 and not conductive along the direction parallel to the first surface of the substrate 301. The thickness of the conductor is 5-40 μm, and its cross section (the section parallel to the first surface) is rectangular. Besides, the cross section of the conductor is not limited to rectangular and can be circle, elliptical, and etc.

The color of the conductor contained in the opening is same with that of the light shielding layer 303. It should be understood that when the opening is multi-hole opening and the through holes of which the opening consists are relatively small, for example, when the diameter of the through holes (or the length of the side of a rectangular through hole, or the length of the long axis of an elliptic through hole) is not more than 0.2 mm, the color difference ΔE between the conductor and the light shielding layer 303 is preferably not more than 6; and when the diameter of the through hole (or the length of the side of a rectangular through hole, or the length of the long axis of an elliptic through hole) is not more than 0.05 mm, the color difference ΔE is preferably not more than 10, or even the conductor and the light shielding layer 303 can have totally different color. When the diameter of the through hole (or the length of the side of a rectangular through hole, the length of the long axis of an elliptic through hole) is greater than 0.2 mm, the color difference ΔE between the conductor and the light shielding layer 303 is preferably not more than 3.

Finally, the conductors can be covered by an insulating layer to be prevented from oxidizing when being exposed in air. The insulating layer covers the entire conductors except for their extracting parts. The insulating layer is formed by one or more of colored ink, gloss varnish and colored photo-sensitive resist and patterned as the shape of the black matrix of the capacitive touch panel or patterned to cover the conductors only.

Figure 9:
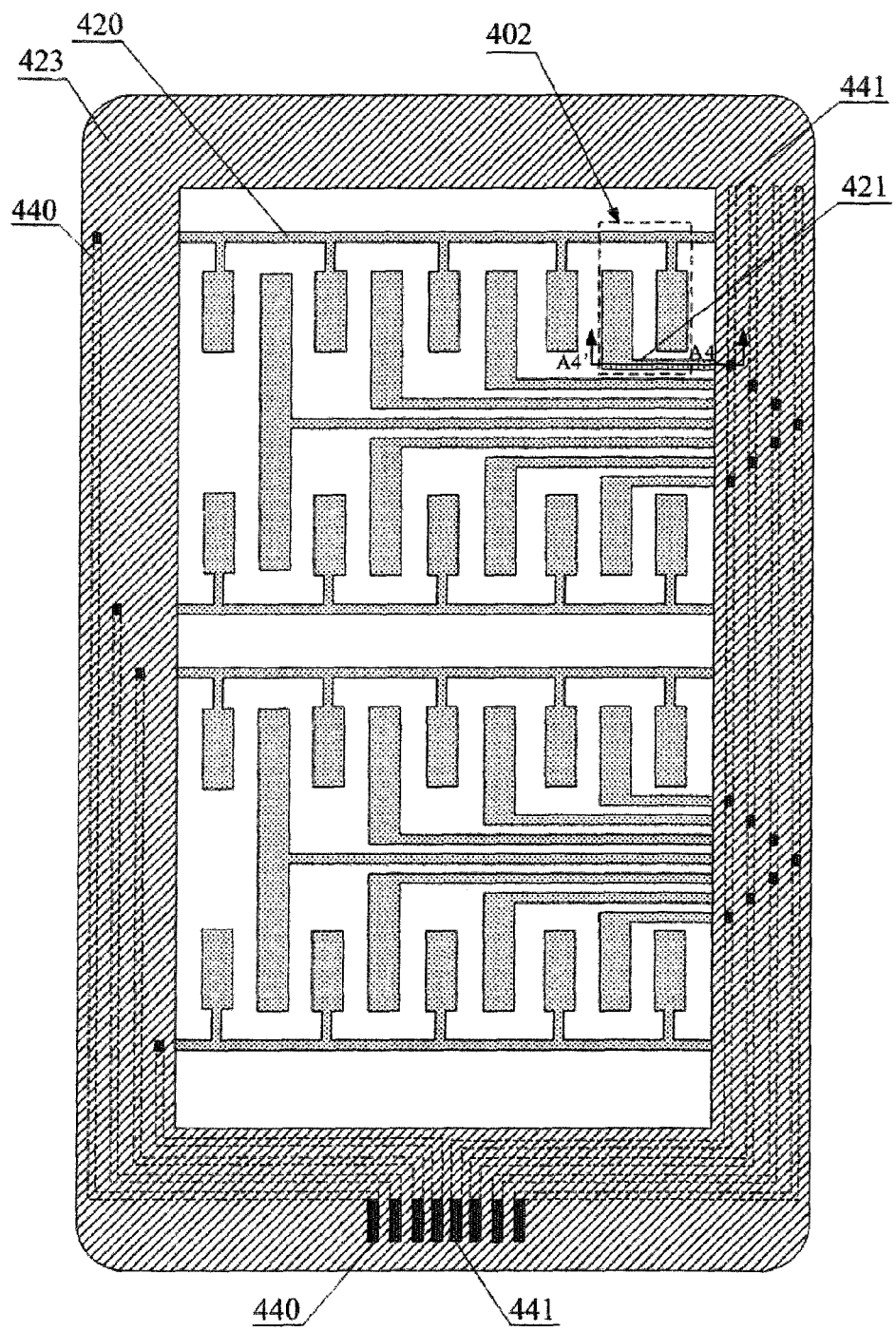
FIG. 9 shows schematically the front view of the OGS capacitive touch panel of the invention in the forth embodiment, wherein the parts of the traces of the touch control units covered by the light shielding layer are indicated by dashed lines.
Figure 10:
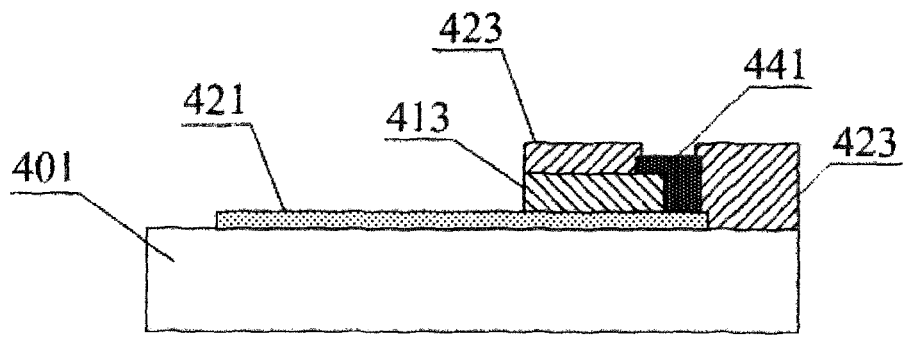
FIG. 10 is the section view of the capacitive panel shown in FIG. 9 along A4A4' direction.
Figure 11:
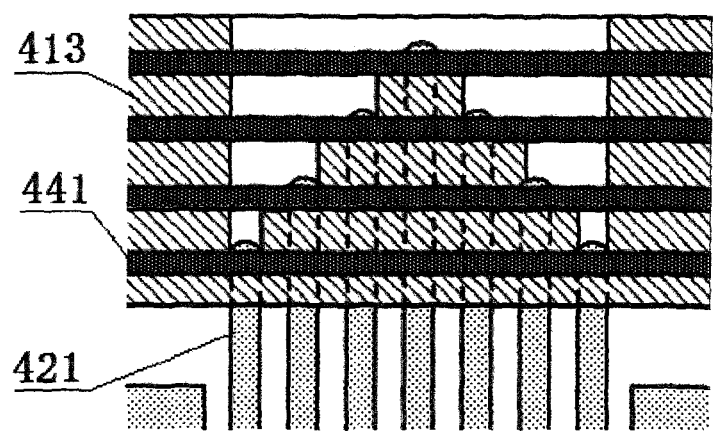
FIG. 11 shows the arrangement of the conductors, the traces of the touch control units and the light shielding layer where the traces of the touch control units connect to the conductors, wherein the parts of the traces of the touch control units covered by the light shielding layer are indicated by dashed lines.

As shown in FIGS. 9-11, in the forth preferred embodiment, the OGS capacitive touch panel of the invention includes a substrate 401, multiple touch control units such as the touch control unit 402, a light shielding layer 413, a second light shielding layer 423, multiple conductors such as the conductors 440 and 441, and multiple traces of the touch control units. Wherein the light shielding layer 413 and the second light shielding layer 423 are insulating layers, and are distributed on the periphery of the capacitive touch panel; the touch control unit consists of a driving part and a sensing part, for instance, the touch control unit 402 consists of a driving part and a sensing part; the multiple touch control units are arranged as an array of touch control units on the first surface of the substrate 401 and in the active area of the capacitive touch panel; on the first surface of the substrate 401 each trace of the touch control units extends from individual touch control unit to the periphery of the capacitive touch panel, for example, the trace 420 of the touch control unit extends from the driving part of the touch control unit 402 and the trace 421 of the touch control unit extends from the sensing part of the touch control unit 402; the light shielding layer 413 partly covers each trace of the touch control units, specifically, the parts of the traces of the touch control units which are in the active area are not covered by the light shielding layer 413. As shown in FIGS. 10 and 11, the parts of the traces of the touch control units which overlap the conductors in the normal direction of the first surface are not covered by the light shielding layer 413. The normal direction of the first surface of the substrate 401 in FIGS. 9 and 11 is perpendicularly outward from the paper and in FIG. 10 it is upward. Each conductor partly covers the light shielding layer 413 and electrically connects to a corresponding trace of a touch control unit where the trace of the touch control unit is not covered by the light shielding layer 413. The second light shielding layer 423 partly covers the traces of the touch control units, the conductors and the light shielding layer 413, and expose part of the conductors which is to be connected to the control circuit of the capacitive touch panel (and expose the parts of the conductors which is to contact with the traces of the touch control units in the embodiment, as shown in FIG. 9, while in other embodiments these parts might not be exposed). In the embodiment, as shown in FIG. 9, the part of the trace 421 of the touch control unit which overlap the conductor 441 in the normal direction of the first surface is partly covered by the light shielding layer 413; the conductor 441 partly covers the light shielding layer 413, and contacts with and electrically connects to the trace 421 of the touch control unit where the trace 421 of the touch control unit is not covered by the light shielding layer 413; the second light shielding layer 423 partly covers the trace 421 of the touch control unit, the conductor 441 and the light shielding layer 413, and exposes partly the conductor 441.

In the embodiment, the light shielding layer 413 and the second light shielding layer 423 can be a layer of colored ink, gloss varnish or colored photo-sensitive resist, that is to say that the material of the light shielding layer 413 and the second light shielding layer 423 can be colored ink, gloss varnish or colored photo-sensitive resist, and the color of the light shielding layer 413 is same with the color of the second light shielding layer 423. The material of the conductors can be anyone of carbon paste and silver paste or a mixture of carbon paste and silver paste, specifically, its material can be carbon paste, silver paste or a mixture of carbon paste and silver paste when the conductor is short, and its material preferably is silver paste when the conductor is long. The substrate 401 can be a tempered glass sheet, hardened glass sheet or general glass sheet, or be a transparent polymer sheet. The touch control units and the traces of the touch control units are patterned conductive film, which can be an ITO film, a layer of graphene, CNT, silver nanowires, metal mesh or other conductive material, that is to say the material of the conductive film can be ITO, graphene, CNT, silver nanowires, metal mesh or other conductive material.

The specific steps to manufacture the capacitive panel of the embodiment are as follows:

Step one, forming the touch control units and the traces of the touch control units on the substrate 401.

In the embodiment we take the one-layered transparent conductive film process, by which the touch control units and the traces of the touch control units are formed with the same layer of transparent conductive film, as an example to illustrate.

Specifically, in the step, first take a glass sheet as the substrate 401, which can be a tempered glass sheet, hardened glass sheet or general glass sheet, or be a transparent polymer sheet; then clean the substrate 401 and choose one surface of the clean substrate 401 as the first surface; then deposit a layer of transparent conductive film on the first surface of the substrate 401, in the embodiment the deposited film is ITO film whose thickness is 15-40 nm, or 5-15 nm, or 40-60 nm; then coat the ITO film with a layer of photosensitive resist, develop the layer to form the pattern of the touch control units and the traces of the touch control units, in the embodiment the lithography process is applied; finally, etch the ITO film the pattern of the touch control units and the traces of the touch control units, and remove the photosensitive resist, the touch control units and the traces of the touch control units are formed on the first surface of the substrate 401. Besides, the process of screen printing can be applied to form the conductive film which is patterned as the touch control units and the traces of the touch control units on the first surface of the substrate 401 directly, to form the touch control units and the traces of the touch control units on the first surface of the substrate 401.

Step two, form the light shielding layer 413 on the substrate 401.

Specifically, apply the process of screen printing to form the light shielding layer 413 on the first surface of the substrate 401, which is patterned to partly cover each trace of the touch control units. In the embodiment, the light shielding layer 413 is formed by colored ink and its thickness is 5-40 µm. As shown in FIG. 11, its edge is step-like where the traces of the touch control units connect to the conductors and this shape enables each conductor to contact with the only trace of a touch control unit which is set to electrically connect to the conductor. In other embodiment, the light shielding layer 413 can present any other shape only if the shape can enable each conductor to contact with the only trace of a touch control unit which is set to electrically connect to the conductor.

Step three, form the conductors.

Specifically, apply the process of screen printing to form the conductors on the first surface of the substrate 401, the traces of the touch control units and the light shielding layer 413. In the embodiment, the material of the conductors is silver paste, the color of the conductors is same with the color of the light shielding layer 413 and the color of the second light shielding layer 423, and the thickness of the conductor is 5-40 µm. Besides, the conductors can be formed by the process of laser etching, which is specifically as following: forming a layer of silver paste with a desired thickness on the first surface of the substrate 401, the traces of the touch control units and the light shielding layer 413, laser etching the layer of silver paste to form each conductor.

Step four, form the second light shielding layer 423.

Specifically, apply the process of screen printing to form the second light shielding layer 423 on the first surface of the substrate 401, the traces of the touch control units, the conductors and the light shielding layer 413, which is patterned as the shape of the black matrix of the capacitive touch panel and has openings in it. The second light shielding layer 423 partly covers the first surface of the substrate 401, the traces of the touch control units and the conductors, and partly covers the light shielding layer 413. In the embodiment, the second light shielding layer 423 is formed by colored ink and its thickness is 5-40 µm (and it should be understood that FIG. 10 is a schematic diagram and in practice the thickness of the second light shielding layer 423 might be smaller than the thickness of the conductors). The openings in the second light shielding layer 423 are used to expose the parts of the conductors which are to connect to the control circuit of the capacitive touch panel and the parts of the conductors which are to electrically connect to the individual trace of the touch control units. In other embodiments, the second light shielding layer 423 can present any other shape only if the combined light shielding layer 413 and second light shielding layer 423 presents the shape of the black matrix of the capacitive touch panel and has openings in it to expose the parts of the conductors which are to connect to the control circuit of the capacitive touch panel. Preferably, the second light shielding layer 423 covers the entire conductors except for their extracting parts, to prevent the conductors from oxidizing when being exposed in air.

Besides, when the conductors have parts of them not covered by the second light shielding layer 423 except for their extracting parts, an insulating layer can be applied to cover the parts not covered by the second light shielding layer 423 to prevent them from oxidizing when being exposed in air. The insulating layer is formed by one or more of colored ink, gloss varnish and colored photo-sensitive resist and patterned as the shape of the black matrix of the capacitive touch panel or patterned to cover the parts of the conductors not covered by the second light shielding layer 423 only.

Besides, in the embodiment, the light shielding layer 413 and the second light shielding layer 423 can be exchanged, that is to say that taking the second light shielding layer 423 as the light shielding layer and taking the light shielding layer 413 as the second light shielding layer will not interfere with the implementation of the invention.

Figure 12:
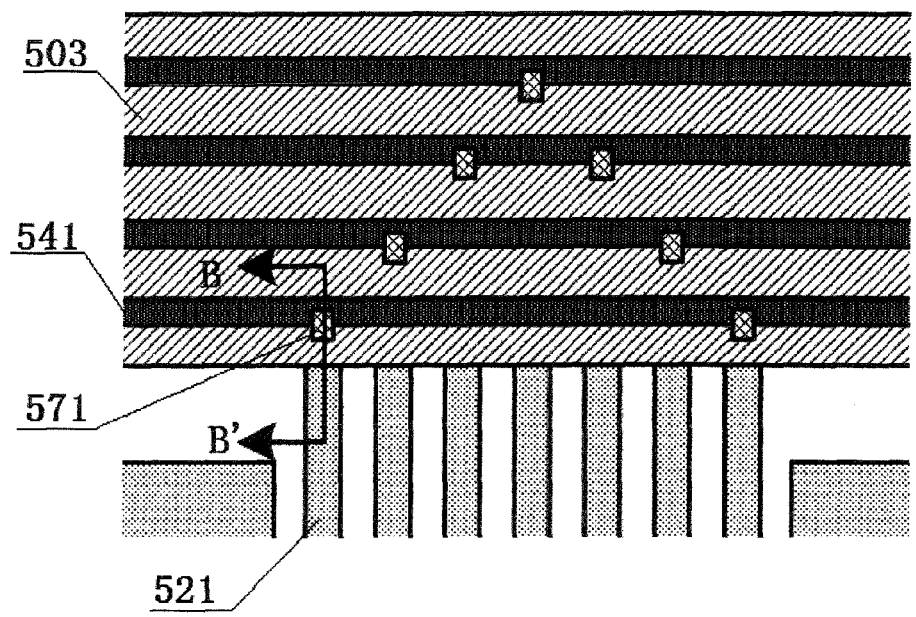
FIG. 12 shows schematically the front view of the OGS capacitive touch panel of the invention in the fifth embodiment.
Figure 13:
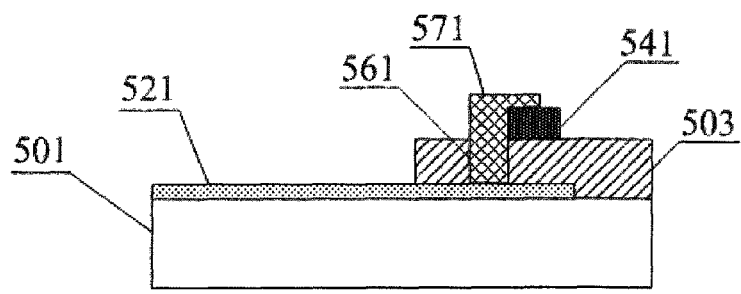
FIG. 13 is the section view of the capacitive panel shown in FIG. 12 along BB' direction.

The fifth preferred embodiment is similar to the first preferred embodiment, wherein the OGS capacitive touch panel of the invention includes a substrate 501, multiple touch control units, a light shielding layer 503, multiple through holes such the through hole 561, multiple conductors such as the conductor 541, and multiple traces of the touch control units such as the trace 521 of the touch control unit. The light shielding layer 503 is an insulating layer, and is distributed on the periphery of the capacitive touch panel. There is a conductive body in a through hole, and the conductive body contacts with a trace of a touch control unit, for example, there is a conductive body 571 in the through hole 561, and the conductive body 571 contacts with the trace 521 of the touch control unit. What's different from the first embodiment is that in the embodiment the conductive bodies are distributed outside of the through holes as well and the parts outside of the through holes contact with conductors to enable each conductor to electrically connect to individual trace of a touch control unit via them. As shown in FIGS. 12 and 13, the conductive body 571 is distributed outside of the through hole 561 as well, and the part of the conductive body 571 outside of the through hole 561 covers the conductor 541, the conductor 541 is electrically connected to the trace 521 of the touch control unit. Similarly to the first preferred embodiment, in the embodiment each trace of the touch control units can correspond to multiple through holes and the trace contacts with the bottom ends of these through holes. One or more of these through holes have conductive body distributed in them, the conductive body contacts with the trace of the touch control unit and the corresponding conductor contacts with the trace of the touch control unit to electrically connect to it via the conductive body in one ore more through holes.

The materials of the components of the OGS capacitive touch panel in the embodiment are same with those in the first embodiment and will not be described here. The specific steps to manufacture the capacitive panel of the embodiment are as follows:

Step one, forming the touch control units and the traces of the touch control units on the substrate 501.

Step two, form the light shielding layer 503 on the substrate 501.

Step three, form the conductors on the light shielding layer 503, then distribute the conductive body into the through holes and on the conductors.

The above steps one and two are same with those in the first embodiment and will not be described here. In the following, the step three will be described.

Specifically in the step three, apply the process of screen printing to form each conductor on the light shielding layer 503. In the embodiment, the material of the conductors is silver paste and the thickness of the conductor is 5-40 μm. Then apply the process of screen printing to fill the material of the conductive body into each through hole which are formed in the step two, in the embodiment, the material of the conductive body is silver paste whose color is same with the color of the light shielding layer 503; the height of the filled conductive body is higher than the thickness of the light shielding layer 103, and preferably is 1-45 μm. The conductive body covers the conductor and preferably the thickness of the part of the conductive body on the conductor is 1-15 μm.

It should be understood that in the embodiment the part of a conductive body outside of a through hole covers a conductor, but in other embodiments the conductor can cover or adjacent to the part of the conductive body only if they contact to each other. Manufacturer can alter the order of the processes in step three to realize these structures, that is to say that forming the conductors firstly and then distributing the conductive bodies or distributing the conductive bodies firstly and then forming the conductors.

Figure 14:
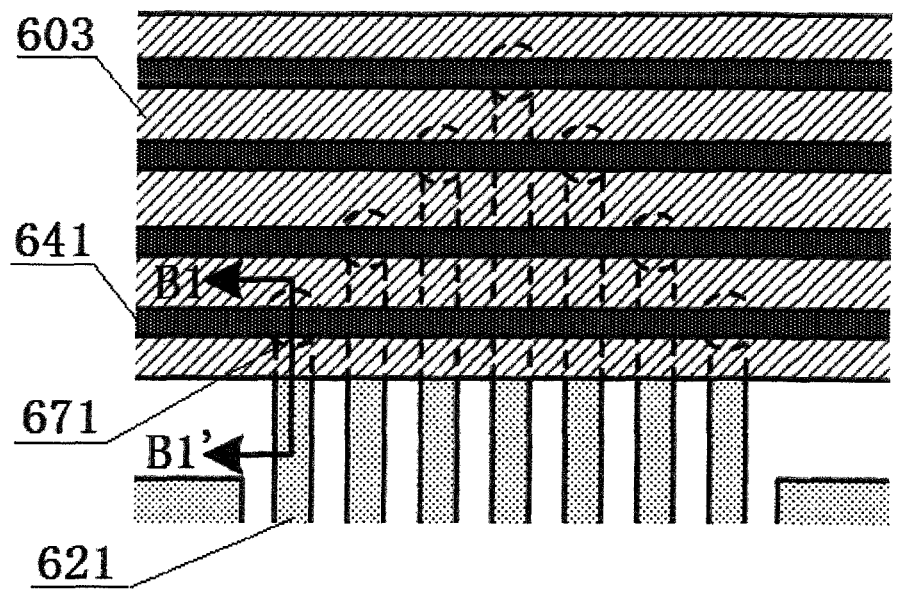
FIG. 14 shows schematically the front view of the OGS capacitive touch panel of the invention in the sixth embodiment, wherein the parts of the traces of the touch control units covered by the light shielding layer are indicated by dashed lines.
Figure 15:
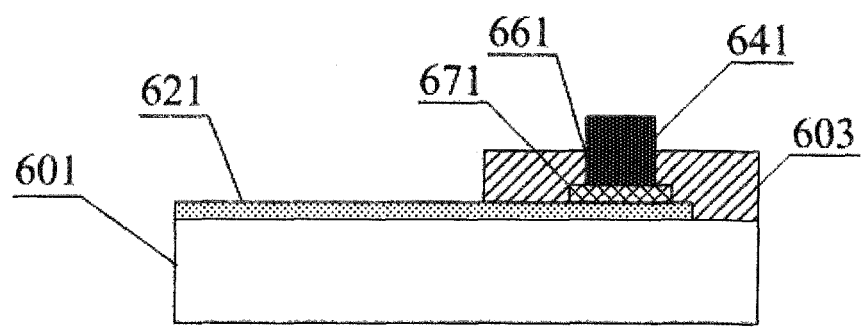
FIG. 15 is the section view of the capacitive panel shown in FIG. 15 along B1B1' direction.

As shown in FIGS. 14 and 15, in the sixth preferred embodiment, the OGS capacitive touch panel of the invention includes a substrate 601, multiple touch control units, a light shielding layer 603, multiple conductors such as the conductor 641, multiple traces of the touch control units such as the trace 621 of the touch control unit, and multiple conductive bodies such as the conductive body 671. Wherein the structures, patterns and distributions of the substrate 601, the touch control units, the conductors and the traces of the touch control units are same with those in the first embodiment, and will not be described here. The light shielding layer 603 is an insulating layer with through holes in it, such as the through hole 661, and is distributed on the periphery of the capacitive touch panel. On the substrate 601 each trace of the touch control units extends from the driving part and the sensing part of individual touch control unit to individual through hole in the light shielding layer 603, for example, the trace 621 of the touch control unit extends to the through hole 661. Each trace of the touch control units is covered by a conductive body at a through hole, one end of the conductive body contacts with the trace of the touch control unit and the other end of the conductive body contacts with the through hole, specifically, the other end of the conductive body contacts with the bottom edge of the through hole. The conductive body prevents the trace of the touch control unit from contacting with the edge of the through hole. For example, the trace 621 of the touch control unit is covered by the conductive body 671 and the conductive body 671 prevents the trace 621 from contacting with the edge of the through hole 661. Each conductor has part of it in a corresponding through hole and contacts with individual conductive body. For example, the conductor 641 has part of it in the through hole 661 and contacts with the conductive body 671. The case that one conductive body covering a trace of a touch control unit corresponds to one through hole and contacts to the bottom end of the through hole is described above, and similarly to the previous embodiments, the conductive body can correspond to multiple holes and contacts to the bottom ends of these through holes. The corresponding conductor is distributed into at least one of these through holes to contact with the conductive body to electrically connect to the trace of the touch control unit.

The materials of substrate 601, the touch control units, the light shielding layer 603, the conductors and the traces of the touch control units in the embodiment are same with those in the first embodiment and will not be described here. The material of the conductors can be carbon paste, silver paste or anisotropic conductive paste (anisotropic conductive adhesive or anisotropic conductive film), or a mixture of any two or three of carbon paste, silver paste and anisotropic conductive paste, specifically the material of the conductors can be silver paste, carbon paste or anisotropic conductive paste when the conductors are short, and the material preferably is silver paste when the conductors are long. When anisotropic conductive paste is chose to form the conductors, it should be noted that attention should be paid to the soldering, bonding or hot pressure welding position when connect the conductors to the control circuit of the capacitive touch panel by way of soldering, bonding or hot pressure welding, to ensure the electrically connection between the control circuit and the traces of the touch control units via the conductors, for example, the soldering, bonding or hot pressure welding position should be at the part of a conductor which overlap a corresponding trace of a touch control unit in the normal direction of the first surface. The color of the conductors is same with the color of the light shielding layer 603.

The specific steps to manufacture the capacitive panel of the embodiment are as follows:

Step one, forming the touch control units and the traces of the touch control units on the substrate 601.

In the embodiment we take the one-layered transparent conductive film process, by which the touch control units and the traces of the touch control units are formed with the same layer of transparent conductive film, as an example to illustrate.

Specifically, in the step, first take a glass sheet as the substrate 601, which can be a tempered glass sheet, hardened glass sheet or general glass sheet, or be a transparent polymer sheet; then clean the substrate 601 and choose one surface of the clean substrate 601 as the first surface; then deposit a layer of conductive film on the first surface of the substrate 101, in the embodiment the deposited film is ITO film whose thickness is 5-60 nm; then coat the ITO film with a layer of photosensitive resist, develop the layer to form the pattern of the touch control units and the traces of the touch control units, in the embodiment the lithography process is applied; finally, etch the ITO film the pattern of the touch control units and the traces of the touch control units, and remove the photosensitive resist, the touch control units and the traces of the touch control units are formed on the first surface of the substrate 601. Besides, the process of screen printing can be applied to form the conductive film which is patterned as the touch control units and the traces of the touch control units on the first surface of the substrate 601 directly, to form the touch control units and the traces of the touch control units on the first surface of the substrate 601.

In the embodiment, the width of each trace of the touch control units is 0.003-0.1 mm, and the spacing between two adjacent traces is 0.03-0.8 mm.

Step two, form the conductive body the traces of the touch control units.

Specifically, apply the process of screen printing to form a conductive body at one end of each trace of the touch control units (the end disconnected to the touch control unit) with carbon paste, whose color is same with the color of the light shielding 603 to be formed later. Preferably, the shape of the cross section (the section parallel to the first surface) of the conductive body is circle with a diameter of 0.25-0.5 mm. In other embodiments of the invention, the shape of the cross section of the conductive body can be rectangular, elliptical, and etc.

Step three, form the light shielding layer 603 on the substrate 601, which has through holes in it.

Specifically, apply the process of screen printing to form the light shielding layer 603 on the first surface of the substrate 601 with colored ink, which is patterned as the black matrix of the capacitive touch panel and has through holes in it, and its thickness is 5-40 μm. The through holes are aligned with the conductive bodies, and their cross sections are circle with a diameter of 0.1-0.3 mm. Each through hole extends along the normal direction of the first surface, one of its end contacts with a conductor and the other end contacts with a conductor. In other embodiments, the shape of the cross section of the through hole can be rectangular, elliptical, and etc., and preferably matches with the shape of the conductive body.

Step four, form the conductors, which are electrically connected to the conductive bodies through the through holes.

Specifically, apply the process of screen printing to form each conductor on the light shielding layer 603, which are arranged to have parts of them aligned with the through hole and thus distributed into the through holes. The thickness of the conductors is 5-40 μm. Besides, the conductors can be formed by the process of laser etching, which is specifically as following: forming a layer of silver paste with a desired thickness on the light shielding layer 603, laser etching the layer of silver paste to form each conductor on the light shielding layer 603.

Finally, the conductors can be covered by an insulating layer to be prevented from oxidizing when being exposed in air. The insulating layer covers the entire conductors except for their extracting parts. The insulating layer is formed by one or more of colored ink, gloss varnish and colored photo-sensitive resist and patterned as the shape of the black matrix of the capacitive touch panel or patterned to cover the conductors only.

The preferred embodiments of the invention have been described above in detail. It is to be understood that those skilled in the art may make changes or modifications based on the inventive concepts of the invention without any creative work. Accordingly, any technical solution that those skilled in the art conceived by way of logic analysis, reasoning or finite experiments, should be considered to be in the extent of protection as defined by the claims.

The invention claimed is:

1. A capacitive touch panel, including a substrate, a touch control unit, an insulating layer, a conductor and a trace of the touch control unit,
    wherein the touch control unit and the insulating layer are arranged on a first surface of the substrate, the touch control unit is arranged in an active area of the capacitive touch panel, and the insulating layer is formed on a periphery of the capacitive touch panel,
    characterized in that:
        the trace of the touch control unit extends from the touch control unit on the first surface,
        on the periphery of the capacitive touch panel, the insulating layer partly covers the trace of the touch control unit
        and the conductor is electrically connected to the trace of the touch control unit on a part of the trace of the touch control unit which is uncovered by the insulating layer;
    wherein the insulating layer is a light shielding layer formed by one or more of colored ink, gloss varnish and colored photo-sensitive resist;
    wherein the capacitive touch panel includes a conductive body; there are one or more through holes in the light shielding layer; one end of the conductive body contacts with the trace of the touch control unit and the other end of the conductive body contacts with the one or more through hole; and the conductor extends on the light shielding layer and passes through the one or more through holes to contact with the conductive body;
    wherein the trace of the touch control unit does not contact with an edge of the one or more holes; the conductor is partly distributed in the one or more through holes and the part of the conductor which is in the one or more through holes contacts with the conductive body; and the conductor is electrically connected to the trace of the touch control unit via the conductive body;

wherein the capacitive panel includes a second insulating layer, which covers the conductor;

wherein part of the conductor which is to be connected to a control circuit of the capacitive touch panel is an extracting part of the conductor, and the extracting part of the conductor is not covered by the second insulating layer.

\* \* \* \* \*